United States Patent [19]
Komatsu

[11] Patent Number: 4,633,353
[45] Date of Patent: Dec. 30, 1986

[54] CASSETTE LID STOP DEVICE IN A CASSETTE TAPE RECORDER

[75] Inventor: Norimasa Komatsu, Kakuda, Japan

[73] Assignee: Alps Electric Co., Ltd., Japan

[21] Appl. No.: 531,599

[22] Filed: Sep. 12, 1983

[30] Foreign Application Priority Data

Sep. 13, 1982 [JP] Japan .......................... 57-137616[U]

[51] Int. Cl.⁴ ................................................ G11B 5/54
[52] U.S. Cl. ..................................... 360/105; 360/96.6
[58] Field of Search .................... 360/95, 96.1, 96.2, 360/96.3, 96.4, 96.5, 96.6, 93, 94; 242/198, 199

[56] References Cited

U.S. PATENT DOCUMENTS

| 3,692,257 | 9/1972 | Righi | 360/96.3 |
| 4,050,087 | 9/1977 | Kishi | 360/96.6 |
| 4,107,753 | 8/1978 | Izumikawa | 360/93 |
| 4,150,410 | 4/1979 | Tsumura | 360/96.5 |
| 4,325,091 | 4/1982 | Uchida | 360/96.6 |
| 4,369,474 | 1/1983 | Kamimura et al. | 360/96.1 |
| 4,467,378 | 8/1984 | Schatteman | 242/198 |
| 4,491,889 | 1/1985 | Tsuchiya | 360/96.6 |

FOREIGN PATENT DOCUMENTS

| 0133309 | 10/1979 | Japan | 360/96.6 |
| 2084785 | 4/1982 | United Kingdom | 360/96.1 |

Primary Examiner—John H. Wolff
Assistant Examiner—Andrew L. Sniezek
Attorney, Agent, or Firm—Guy W. Shoup

[57] ABSTRACT

A cassette ejector in a cassette tape recorder wherein a cassette lid urged in an opening direction is pivotably mounted on a chassis and a cassette inserted in the cassette lid is opposed to a head by closing the cassette lid, the cassette lid being provided with a cam portion which, when the cassette lid is closed, comes into engagement with a head base to move the head up to a predetermined position, the cassette lid being further provided with a stopper portion which, when the cassette lid is opened, comes into abutment with the head base to stop the opening motion of the cassette lid temporarily.

4 Claims, 6 Drawing Figures

CASSETTE LID STOP DEVICE IN A CASSETTE TAPE RECORDER

BACKGROUND OF THE INVENTION (1) Field of the Invention

The present invention relates to a cassette ejector in a cassette tape recorder.

(2) Description of the Prior Art

As a cassette ejector in a conventional cassette tape recorder, there is known one having such a structure as shown in FIGS. 1 through 3. That is, a cassette lid 2 is attached to a chassis 1 pivotably about a pivot shaft 3, it being urged in an opening direction by means of a spring (not shown) at all times, with a cam plate 4 having a chevron-like cam portion 4a being attached to the cassette lid 2. On the chassis 1 is mounted a head base 5 slidably in the horizontal direction, which base 5 is pulled in the right-hand direction by means of a spring 5a at all times, with a roller 6 being embedded in the leftmost end of the head base 5 and a head 7 attached to the rightmost end thereof. A cassette 8 incorporating a tape therein is inserted in the cassette lid 2 in an open condition of the lid as shown in FIG. 1. When the cassette lid 2 is rotated in a closing direction (clockwise), the cam portion 4a of the cam plate 4 abuts the roller 6 on the head base 5 and causes it to advance to the left, as shown in FIG. 2. As the cassette lid 2 is further pressed, it is locked by a locking mechanism (not shown) and the tape contacts the head 7 as shown in FIG. 3.

When the locking mechanism for the cassette lid 2 is released, the cassette lid 2 is rotated in its opening direction by virtue of the biasing force of the spring, so that the cam portion 4a is disengaged from the roller 6. Consequently, the head 7 attached to the head base 5 is moved back in the original right-hand direction by means of the spring, and the cassette lid 2 assumes its opened state shown in FIG. 1.

In the above-described conventional structure, however, when the cassette is being ejected, if the cassette lid 2 is unlocked, the cassette lid 2 will be opened before complete separation of the cassette 8 from the head 7 because the opening speed of the cassette lid 2 is much higher than the retreating speed of the head base 5, so that the cassette lid 2 is opened while the cassette 8 and the head 7 are in contact with each other or while the tape contained in the cassette 8 is hooked by, for example, a tape guide of the head 7, resulting in the tape and the head 7 or the cassette 8 being easily damaged.

SUMMARY OF THE INVENTION

It is the object of the present invention to provide a cassette ejector capable of eliminating the above-mentioned drawbacks and preventing damage of the tape and the head or the cassette half in a simple construction.

In order to attain the above object, the present invention is characterized in that, in a cassette tape recorder wherein a cassette lid urged in an opening direction is pivotably mounted on a chassis and a cassette inserted in the cassette lid is opposed to a head by closing the cassette lid, the cassette lid is provided with a cam portion which, when the cassette lid is closed, comes into engagement with a head base to move the head up to a predetermined position, and also provided with a stopper portion which, when the cassette lid is opened, comes into abutment with the head base to stop the opening motion of the cassette lid temporarily.

DESCRIPTION OF A PREFERRED EMBODIMENT

Figure 1:
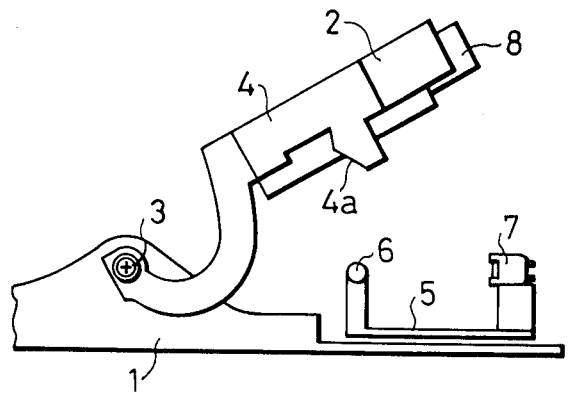
FIGS. 1 through 3 are side views illustrative of loading states of a cassette according to the prior art.
Figure 2:
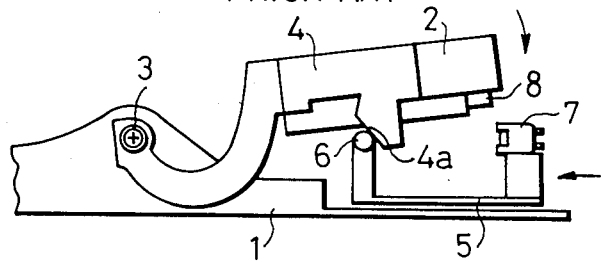
Figure 3:
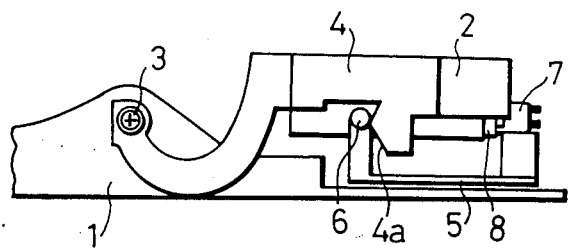

An embodiment of the present invention will be described hereinunder with reference to FIGS. 4 through 6.

A bearing portion 1a is formed on upright walls on both sides of a chassis 1, and a cassette lid 2 is supported by the bearing portion 1a pivotably through a collar 9 and a screw 3. The cassette lid 2, which holds a cassette 8 incorporating a magnetic tape therein, is urged in an opening direction at all times by the action of a spring 11 or the like. To the cassette lid 2 is fixed a cam plate 4, which is formed with a chevron-like cam portion 4a and a chevron-like stopper portion 4b, the cam portion 4a and the stopper portion 4b being opposed to each other in an appropriately spaced relation. On the other hand, on the chassis 1 is mounted a head base 5 horizontally slidably, which is pulled to the right continually by the action of a spring 5a or the like. Further, a roller 6 is embedded in the leftmost end of the head base 5, while to the rightmost end of the head base 5 is attached a head 7.

Figure 4:
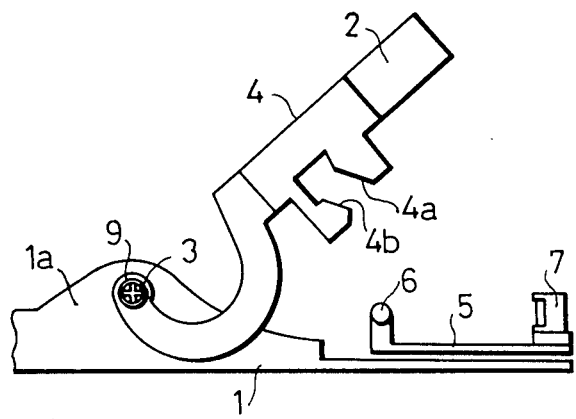
FIGS. 4 through 6 are side views of a cassette ejector embodying the present invention, FIG. 4 showing an opened state of a cassette lid, FIG. 5 showing a closed state thereof and FIG. 6 showing a slightly opening state thereof.
Figure 5:
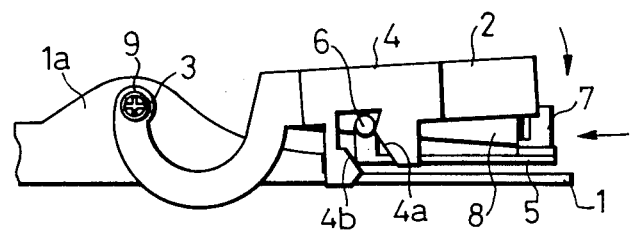
Figure 6:
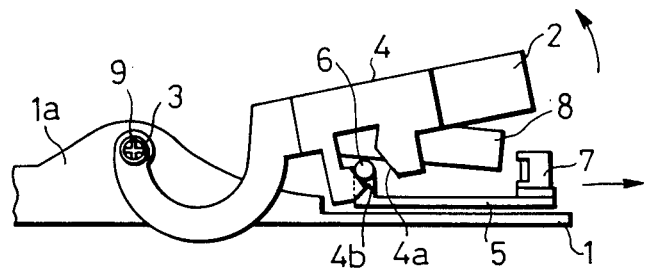

The cassette 8 is inserted in the cassette lid 2 in an opened state of the cassette lid 2 shown in FIG. 4, and when the cassette lid 2 is rotated in a closing direction (clockwise in the figure) against the biasing force of the spring, the cam portion 4a of the cam plate 4 abuts the roller 6 on the head base 5 and causes the latter to move to the left against the spring, as shown in FIG. 5. As the cassette lid 2 is further rotated in its closing direction, the cassette lid 2 is locked by a locking mechanism (not shown), and the tape in the cassette 8 is opposed to the head 7 which has been moved forward, thus allowing the tape recorder to assume the state of PLAY (or CUE/REV).

The ejecting operation for the cassette 8 is performed by releasing the locking mechanism for the cassette lid 2. FIG. 6 shows a slightly opening state of the cassette lid 2 upon release of the locking mechanism. The unlocked cassette lid 2 tries to open rapidly by virtue of the biasing force of the spring, but this rapid opening motion is inhibited by abutment of the stopper portion 4b of the cam plate 4 with the roller 6. From this state, the head base 5 is moved back in the original right-hand direction by the action of the spring, whereupon the head 7 separates completely from the cassette 8 and the stopper portion 4b is disengaged from the roller 6, so that the cassette lid 2 opens after a complete separation of the head 7 from the cassette 8.

As set forth hereinabove, the cassette ejector in a cassette tape recorder according to the present invention is capable of temporarily stopping the opening motion of the cassette lid through the stopper portion, thus permitting prevention of damage of the head and the tape or the cassette in a less expensive structure even without using an expensive device such as a damper.

What is claimed is:

1. In a cassette tape recorder wherein a cassette lid urged in an opening direction is pivotably mounted on a chassis and a cassette inserted in said cassette lid is moved to a position opposed to a magnetic head by closing said cassette lid, said heat being mounted on a head base and said head is further adapted to be movable towards and away from said position of the cassette in said cassette lid, said cassette lid being provided with a cam portion which, when said cassette lid is closed, comes into contact with an engagement portion of said movable head base to move said head up to said position, wherein the improvement comprises said cassette lid being further provided with a stopper portion which, when said cassette lid is opened, comes into abutment with said engagement portion of said head base to stop the opening motion of said cassette lid temporarily until said head moves away from said position.

2. An improvement in a cassette tape recorder according to claim 1, wherein said head base is urged by biasing means in a direction opposite to the pivotable mounting of said cassette lid.

3. An improvement in a cassette tape recorder according to claim 1, wherein said cam portion is chevron-shaped and said stopper portion is also chevron-shaped, said cam portion and said stopper portion being opposed to each other in an appropriately spaced relation.

4. An improvement in a cassette tape recorder according to claim 1, wherein said head base engagement portion is a roller adapted to come into abutment with said cam portion and said stopper portion.

* * * * *